INVENTORS
Donald E. Yadon
Burnette I. Noble
BY
ATTORNEYS

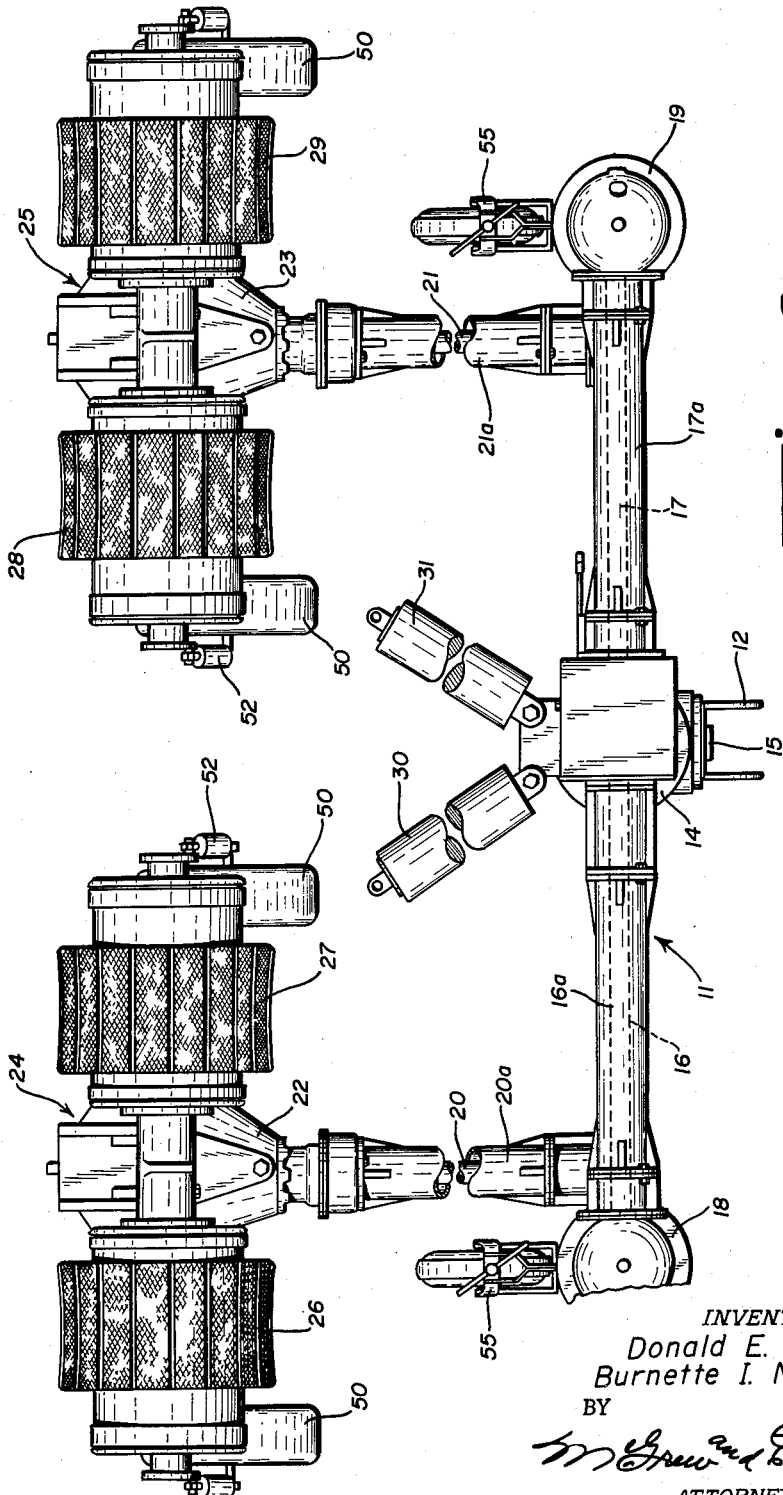

INVENTORS
Donald E. Yadon
Burnette I. Noble

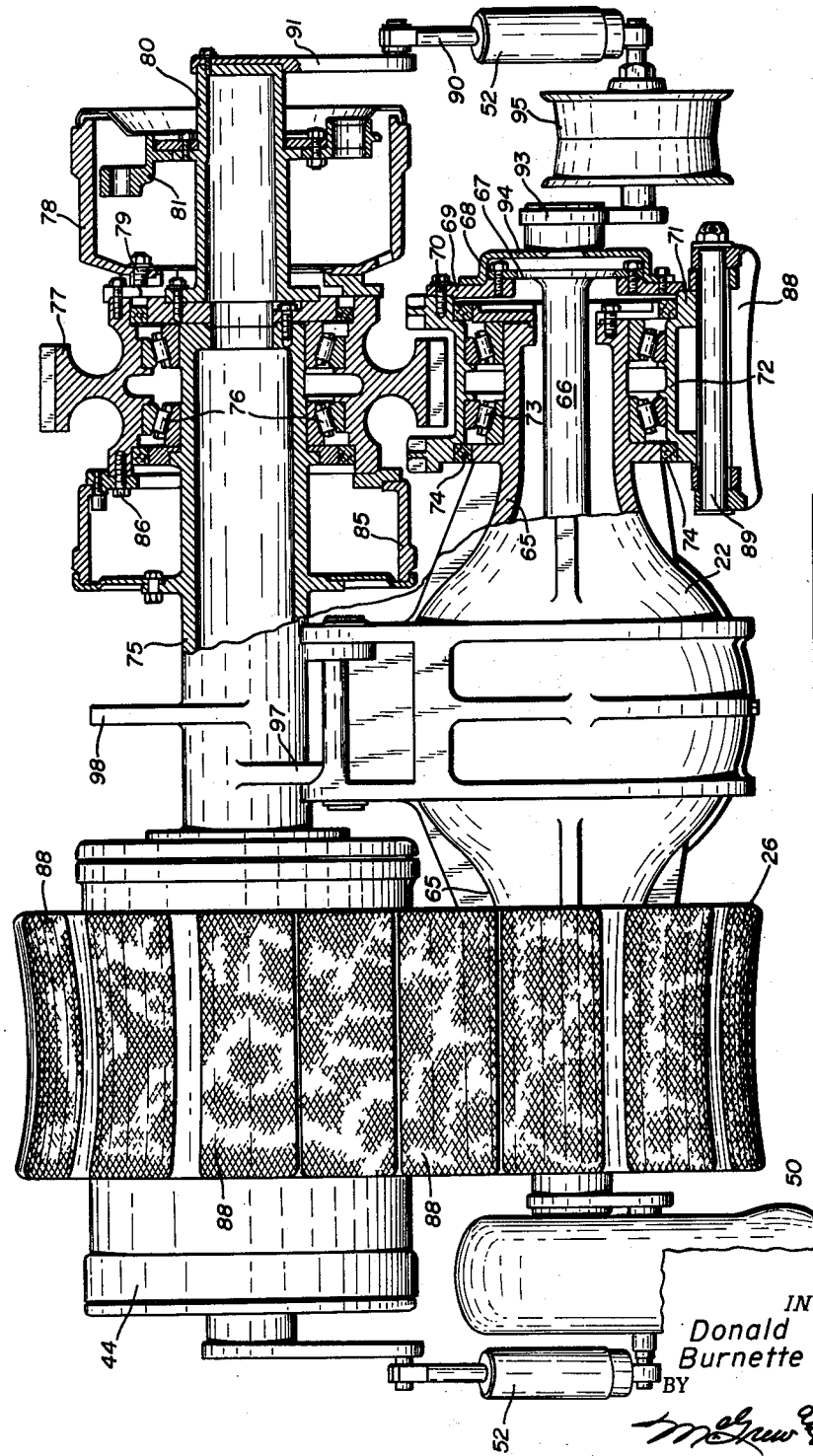

INVENTORS
Donald E. Yadon
Burnette I. Noble
BY
ATTORNEYS

Jan. 29, 1963   D. E. YADON ETAL   3,075,599
AIRCRAFT TUG
Filed March 2, 1959   10 Sheets-Sheet 9
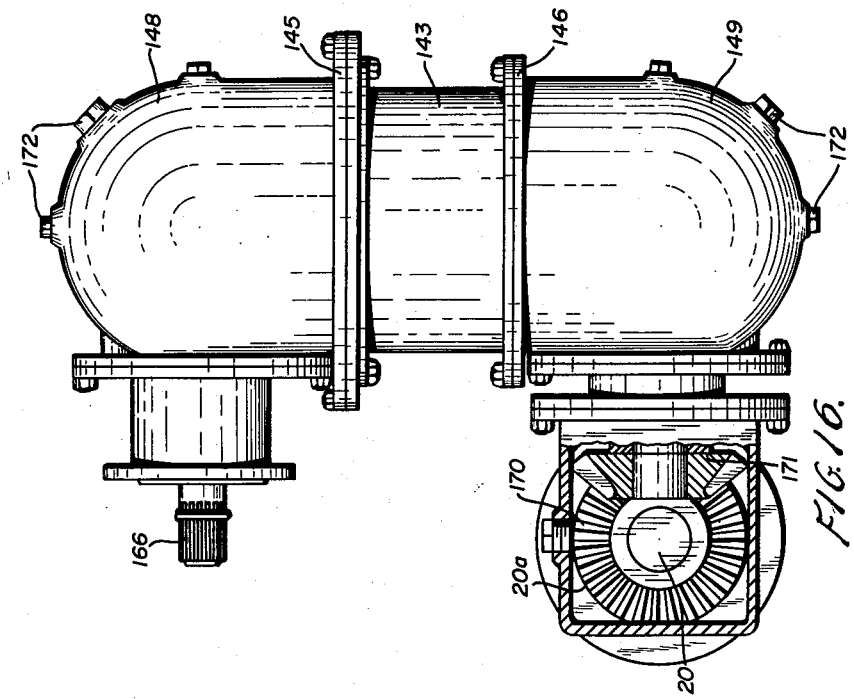
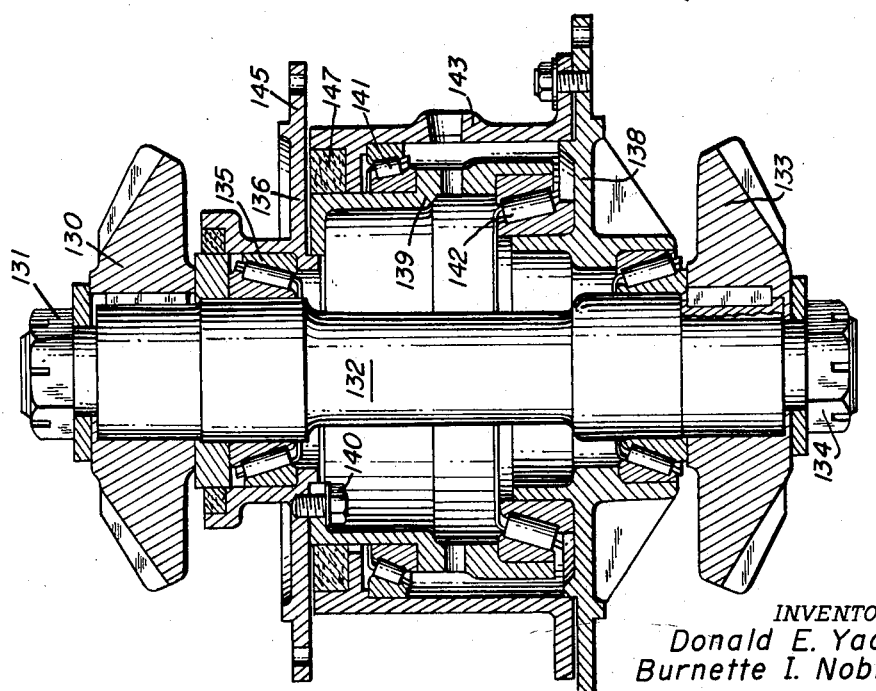
INVENTORS
Donald E. Yadon
Burnette I. Noble
BY
ATTORNEYS Jan. 29, 1963 D. E. YADON ETAL 3,075,599
AIRCRAFT TUG
Filed March 2, 1959 10 Sheets-Sheet 10

INVENTORS
Donald E. Yadon
Burnette I. Noble
BY
*McGrewey Edwards*
ATTORNEYS

United States Patent Office 3,075,599
Patented Jan. 29, 1963

3,075,599
AIRCRAFT TUG
Donald E. Yadon, Dupont, and Burnette I. Noble, Littleton, Colo., assignors to The American Coleman Company, Littleton, Colo., a corporation of Nebraska
Filed Mar. 2, 1959, Ser. No. 796,602
13 Claims. (Cl. 180—14)

This invention relates to apparatus for providing ground movement of aircraft, and more particularly it relates to a tractor and power transmission assembly for providing motivating power to the ground supported wheels of an airplane.

The development of aircraft, both military and commercial, has produced larger and heavier aircraft with each major advance. Recent developments in jet-type aircraft have resulted in still larger and heavier aircraft. As a consequence, ground movement of such larger and heavier aircraft has become a substantial problem. It is obvious that the aircraft engines cannot always be used to move an aircraft around on the ground, and some sort of tractor has been universally used to provide aircraft ground movement under certain conditions. On a straight push or pull basis, normally, the heavier the aircraft the heavier the tractor necessary to provide the traction necessary for the movement of the aircraft. When the ground is slick, the weight of the prime mover or tractor must be sufficiently increased to provide necessary traction. The weight of some modern aircraft far exceeds that of aircraft of a very few years ago, for example a B–52 may approach 500,000 pounds dead weight and others may exceed 600,000 pounds, and the movement of such aircraft has become increasingly difficult.

While it may be possible to provide a tractor of sufficient weight to produce sufficient traction for direct pull or push movement of aircraft, it is obviously an extreme waste of material and a waste of power to merely provide motion of such a vehicle. Thus, a tractor for pulling an aircraft under poor traction conditions must be considerably heavier than a tractor for pulling an aircraft under normal traction conditions. The weight of such a straight pull vehicle, for a B–52 for example, must of necessity approach about half the weight of the aircraft.

According to the present invention, we have invented a prime mover or tractor for the ground movement of aircraft utilizing the power of the tractor engine in a direct application of rotative power to the aircraft wheels. Thus the weight of the aircraft provides the traction to the driving wheels. The device includes driving tracks which may be snubbed up against aircraft tires, and by driving these tracks the aircraft tires are driven. This produces in effect powered wheels for the aircraft. We have further found that aircraft movement is effectively performed by providing a direct power connection to the aircraft wheels and idling the tractor wheels. The drive mechanism may be used as an effective steering mechanism, automatically controlled by turning movement of the tractor. By providing a pantograph-type towing assembly, power steering is applied to the aircraft for simple and easy movement of the aircraft from lineal movement through its minimum turning radius.

A major object of the invention is to provide apparatus for ground movement of an aircraft in which power is supplied directly to the aircraft wheel.

Another object of the invention is to provide mechanism for applying ground movement force to an aircraft by applying motivating power directly to the aircraft wheel through a contacting means having a contact area which is equal to or closely approximating the contact area between the aircraft wheel and the supporting ground.

A further object of the invention is to provide a relatively lightweight aircraft prime mover capable of providing ground movement force to relatively heavy aircraft.

A still further object of the invention is to provide a prime mover for ground supported aircraft arranged to move such aircraft from lineal through minimum radius turns of the aircraft.

A further object of the invention is to provide an aircraft towing mechanism which is arranged to be secured to the aircraft and apply power directly to the aircraft wheel without modification of the aircraft, and which is arranged to be simply and easily attached and disengaged from normal towing lugs of an aircraft without special tools and the like.

A still further object of the invention is to provide a braking or retarding force directly to the aircraft wheels through a propelling drive track so as to utilize the friction between the aircraft tire and the supporting surface for traction.

Another object of the invention is to provide a pantograph-type towing apparatus for an aircraft utilizing a power actuated steering mechanism for the aircraft applied directly to the aircraft wheels and automatically controlled by turning movements of the tractor.

Another object of the invention is to provide a pantograph-type towing apparatus for an aircraft utilizing a system of angularly displaceable transfer members for torque tubes so that the pantograph may be angularly changed without changing the drive characteristics of the tow mechanism.

Other objects and advantages of the invention will be apparent from the following description and appended illustrations in which:

FIG. 6 is a top plan view of a pantograph-type aircraft mover mechanism;

FIG. 8 is a detailed rear elevational view of a portion of the aircraft mover, showing in cross section the track moving and braking system;

FIG. 11 is a cross sectional elevation of a swivel housing for a single plane swivel gear case according to the invention;

FIG. 16 is a side elevational view of a swivel gear box.

In the particular device illustrated, a prime mover, tractor or towing mechanism, is described for towing aircraft having dual-wheel side-by-side landing gear arrangements, such as is found in the B-52 bomber. For this purpose, the tractor portion was designed with a low maximum height so as to be able to drive under the aircraft. It is, of course, obvious that the tractor may be designed to meet various conditions of service as to size and shape. One of the essential conditions is that the tractor engine has sufficient power to provide motivating force for the aircraft mover. For safety and maximum effectiveness, the engine of the prime mover is geared through a transmission and arranged to drive either the tractor wheels or the aircraft mover, but not both at the same time. This may be changed to suit particular situations.

Figure 1:
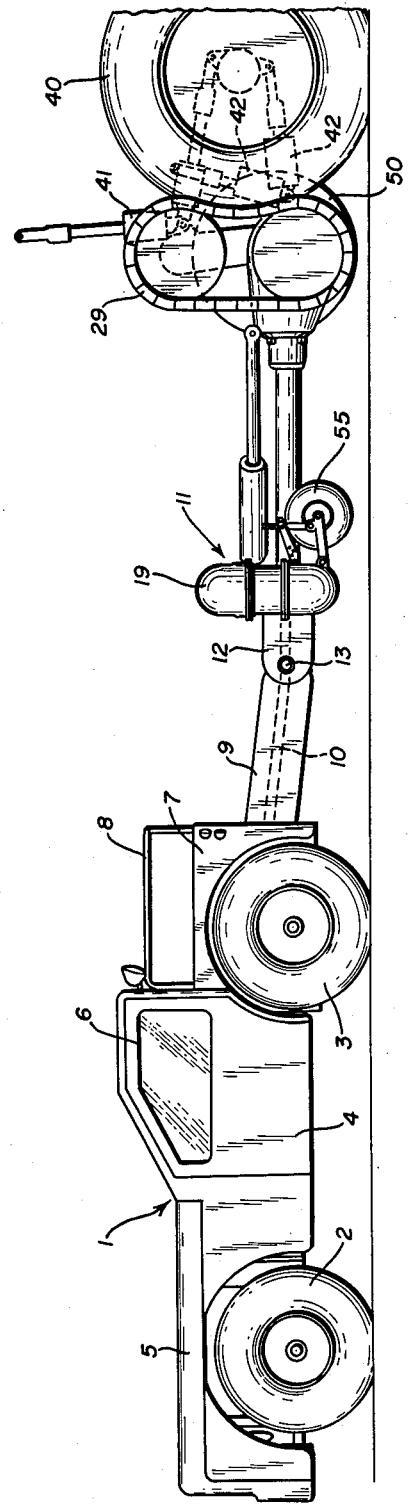
FIG. 1 is a side elevational view of the prime mover and towing mechanism according to the invention illustrated in connection with an aircraft wheel.

The tractor 1 illustrated in FIG. 1 includes front wheels 2 and rear wheels 3 mounted on a chassis 4. The chassis includes an engine compartment 5, a cab 6 and a rear deck 7 surrounded by a railing 8. Since the tractor is to be utilized in moving aircraft, it is essential that the steering of the tractor be arranged to move the aircraft through its minimum radius turning movements which is necessary in maneuvering aircraft into and out of hangars, around parking ramps and even through a compass rose swing. In a preferred form, the tractor 1 utilizes steerable front wheels 2 which may be steered by a conventional steering apparatus and independently steerable rear wheels 3 for oblique movement of the tractor to achieve a minimum turning radius of the aircraft. The steering mechanisms for the front and rear wheels of such tractors are well known and detailed description of such mechanism is not deemed necessary.

The engine of the tractor is connected by a more or less standard transmission which may be automatic or manual shifting, to a gear case, not shown, which provides a direct through drive from the engine and transmission to an aircraft wheel mover or to the differential of the rear wheels 3 of the tractor. For effective operation, the engine generally is connected through a torque converter to the transmission, which is a more or less standard connection for tractor and prime mover type apparatus.

A draw bar 9 is mounted on the rear of tractor 1 and extends rearwardly thereof to provide a connection and power take to an aircraft wheel mover. A propeller shaft 10 mounted in the draw bar is connected through the tractor transmission and torque converter with the tractor engine. Since the propeller shaft 10 is connected with the transmission of the tractor, it is arranged to be driven through the transmission gear train which includes the system of forward gears and the reverse gears.

A wheel mover 11, explained in detail below, is interconnected to the draw bar 9 by means of a yoke 12 pinned by means of a pin 13. The propeller shaft 10 is interconnected by conventional means to the power input connection 15 of a differential 14. One convenient method is to spline the end of the propeller shaft for insertion into a matching input opening, which provides an easy and fast disconnect system, also, various universal joints and the like may be used. The differential 14, described in detail below is a manual lock-up type to compensate for the difference in turn of the spaced-apart wheel movers. This manual lock-up type also prohibits spinning the power out of one of the wheel movers under poor traction conditions. The differential 14 is arranged to swivel in three planes during operation which provides a trunnion action of the wheels, that is, the wheel mover may pass over uneven terrain where one wheel system may be at a different elevation than the other, and, also, permits the tractor to move up and down grades.

As shown in FIG. 6, torque tubes 16a and 17a are secured to each side of the differential housing and each extends in opposite direction from the differential 14. These torque tubes are interconnected to a single plane swivel gear box 18 and 19, respectively. The torque tubes house their respective drive shafts 16 and 17, which are connected to the gears of the swivel gear boxes. These single plane swivel gear boxes provide power transmission to a drive shaft 20 and 21, respectively, which provides power to a heavy-duty torque bias differential 22 and 23, respectively, which powers wheel mover systems 24 and 25. The drive shafts 20 and 21 are housed in torque tubes 20a and 21a respectively. The differentials 22 and 23, also, compensate for the difference in turn of either of the two aircraft wheels which they are driving, and these differentials are of a lock-up type so as to automatically transmit up to 70% of the torque to the wheel having the greatest traction. The wheel movers include a plurality of endless tracks each arranged to be snubbed up against an aircraft wheel for providing power to the same. The differential 22 drives endless tracks 26 and 27 and the differential 23 drives endless tracks 28 and 29.

Figure 2:
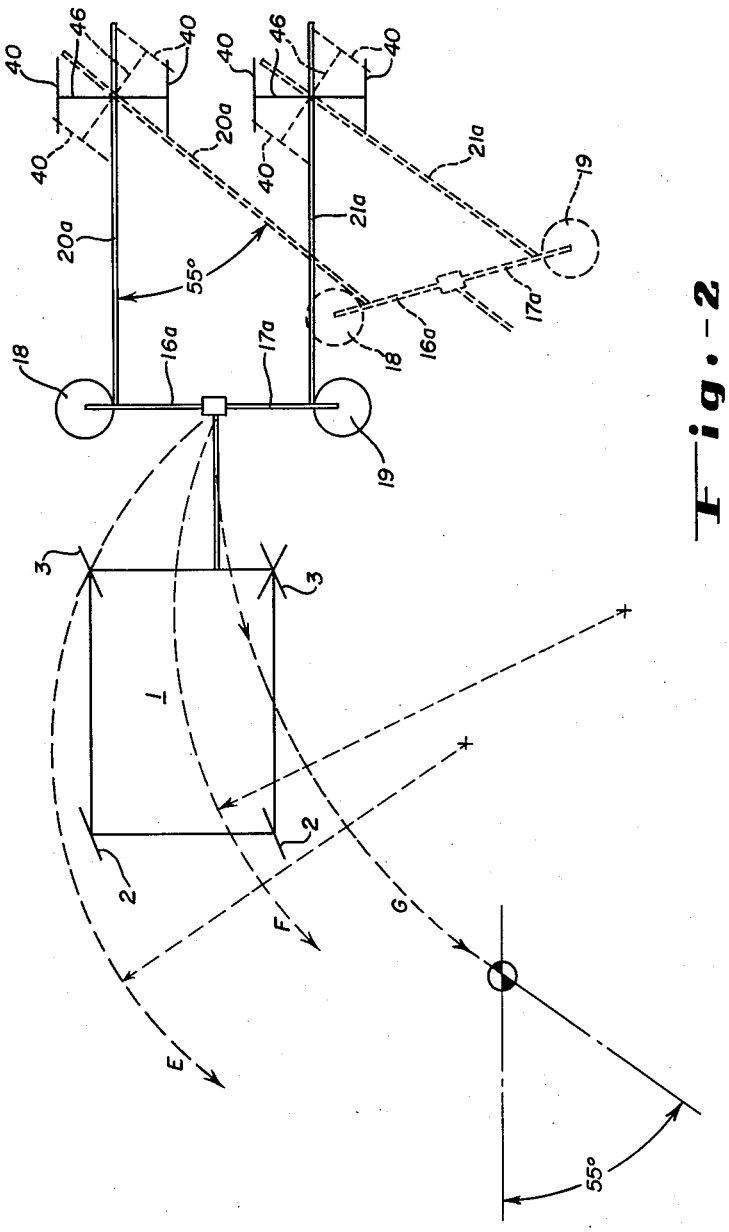
FIG. 2 is a schematic top plan view of an aircraft mover according to the invention illustrating lineal and turning movements of the aircraft.
Figure 4:
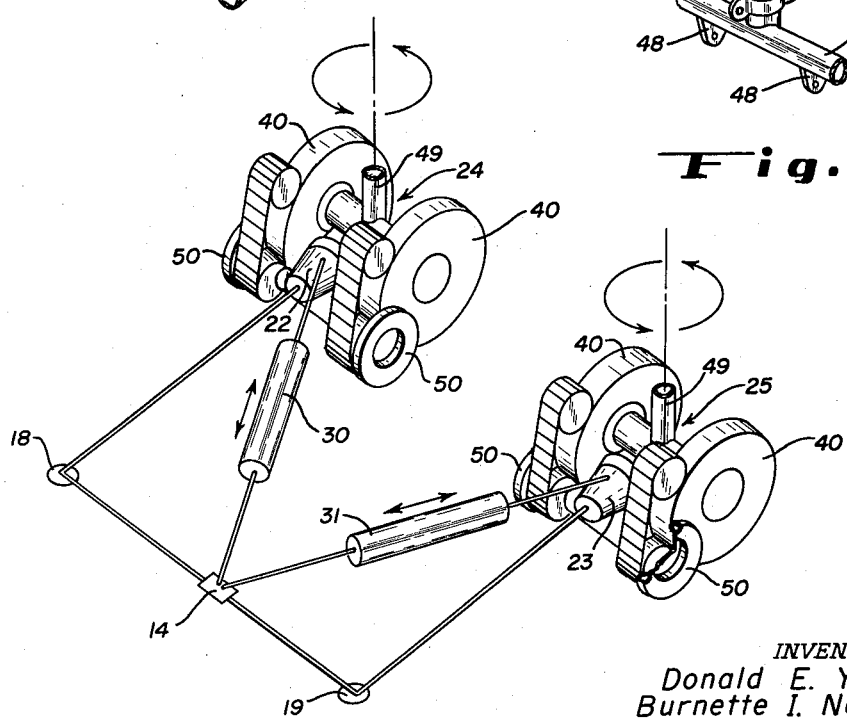
FIG. 4 is a partially schematic perspective view of an aircraft mover for a particular type of aircraft having dual wheel side-by-side landing gear.
Figure 7:
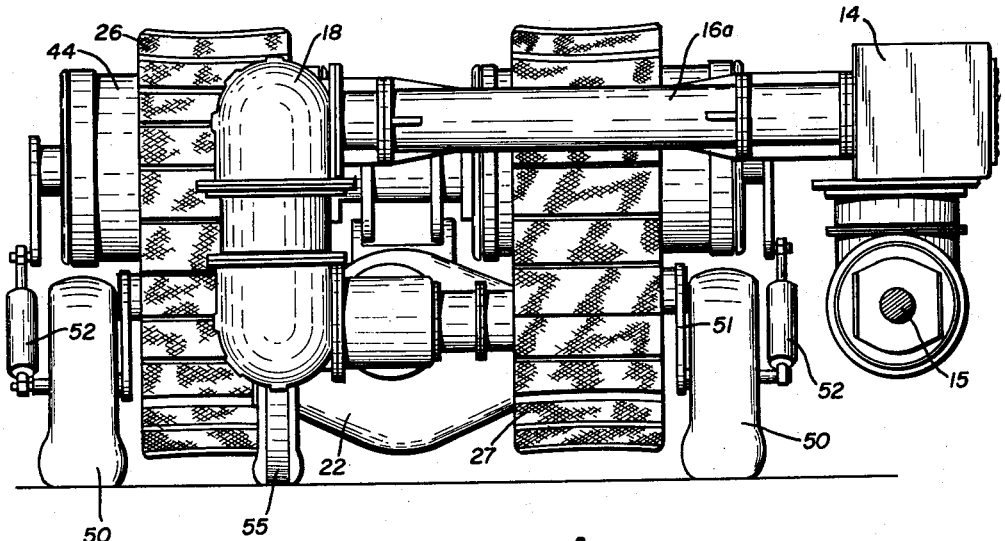
FIG. 7 is a front elevational view of a portion of an aircraft mover system.

The wheel mover is a pantograph-type element in which the torque tubes 16a and 17a form one side and the torque tubes 20a and 21a form two opposed lateral sides. When the wheel mover is attached to an aircraft landing gear, the side of the pantograph opposite the tubes 16a and 17a is formed by the aircraft itself. The spaced apart aircraft wheels pivot in relation to the aircraft, and the pantograph members are mounted on swivels at the two front corners, i.e., swivel gear boxes 18 and 19. Lateral movement of the front side of the pantograph is arranged to pivot the aircraft wheels as shown in FIG. 2. In each case, however, opposite sides of the pantograph remain parallel. Thus sides 20a and 21a remain parallel during parallel turning movements and the sides 16a and 17a remain parallel with the side which is between the pivot center of the two sets of aircraft landing wheels. To provide power for the turning of the aircraft fluid power cylinders 30 and 31, FIG. 4, are connetced between the center differential 14 and the differentials of the individual wheel track assemblies 24 and 25. To change the shape of the pantograph one cylinder must be extended and one must be retracted. A spool type valve, described below, is operated by lateral movement of the tractor in relation to the pantograph which controls the fluid pressure to the cylinders 30 and 31 and provides turning force to the aircraft wheels.

Maximum turning movement of the aircraft is produced with a minimum turning radius. Normally, turning radius of the tractor is not the same as the aircraft, and a dual steering tractor is essential to prevent tire scuffing. As shown in FIG. 2, the tractor wheels are positioned to turn it on a circle F which involves setting the rear steering wheels on circle E which is opposite to the turn of the front wheels. This permits the aircraft to be turned on circle G. The aircraft wheels, in the illustration, are capable of turning 55° which is then the maximum turn. To perform the turn, the tractor operator must effectively use a theoretical turn point, as illustrated, to obtain correct wheel settings, to prevent side slipping and scuffing the tractor wheels. Turn indicators may be placed in the tractor cab where it is desired to provide visual control of the angle of turn of the tractor wheels.

Figure 3:
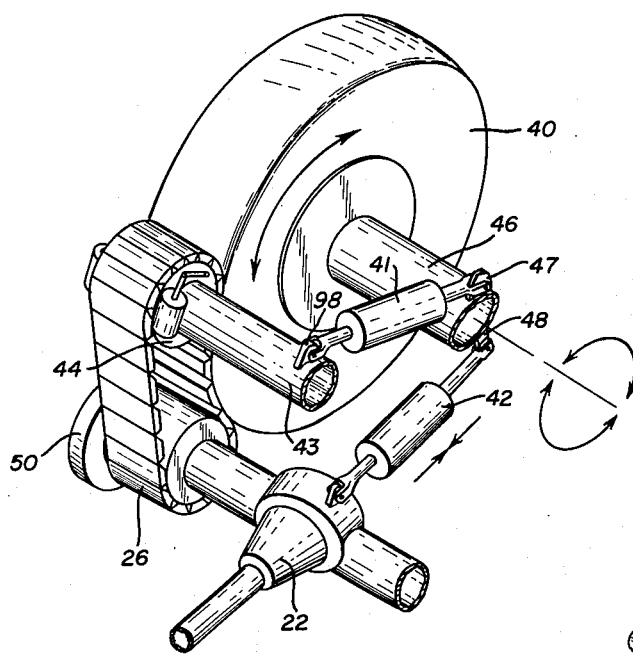
FIG. 3 is an enlarged detailed perspective of one means of attachment of an aircraft moving mechanism to a particular aircraft gear assembly according to the invention.

In order to apply moving power to the aircraft wheels, the endless tracks must be snubbed up against the tread of the aircraft wheel with sufficient force to prevent slippage between the members when the tracks are rotated. The snubbing pressure is determined by the friction conditions between the tracks and the aircraft wheels. It is preferable to snub the tracks only tight enough to prevent slipping on the wheel, since the snubbing pressure is a force to be overcome for wheel turn. A highly effective snubbing system is illustrated in FIG. 3 where a track 26 is snubbed up against an aircraft wheel 40 by means of power cylinders 41 and 42. The upper cylinder 41 is interconnected with a lug 98 on housing 43 which provides a frame for upper track pulley 44. The lower pressure cylinder 42 is interconnected on the differential 22 of the wheel mover. The upper cylinder 41 is interconnected with a towing lug 47 on the upper part of the aircraft wheel axle housing 46 and lower cylinder 42 is interconnected with an opposed lug 48 on the lower part of the axle housing 46. By properly sizing the cylinders in relation to available fluid pressure, sufficient snubbing power can be applied to the tracks to prevent slippage between the tracks and the aircraft tire.

Figure 9:
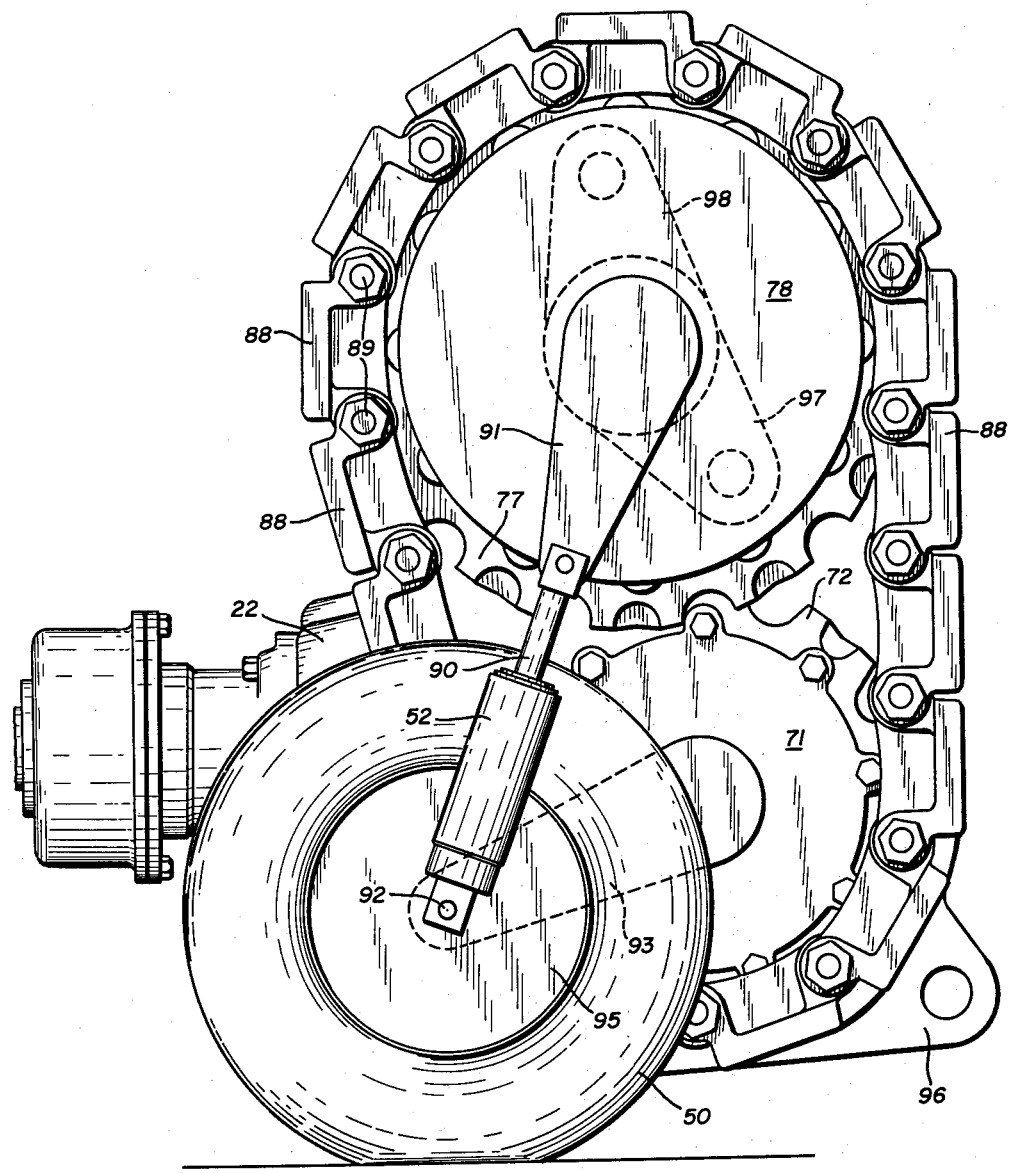
FIG. 9 is a side elevational detail of a wheel moving track according to the invention.

The snubbing system illustrated utilizes two fluid snubbing motors secured to lugs on the upper and lower portions of the aircraft axle housing. Where conditions permit such a system, it is highly desirable since smaller motors may be used to obtain the necessary force, and the spaced connections of the track assembly provides a relatively uniform force over the contact area of track to wheel. In the event equipment on the aircraft landing strut prevents such an arrangement, a single fluid motor may satisfactorily be used. In this case, an intermediate connection point for the fluid motor to the track assembly is provided, for example lug 97 shown on FIG. 9. This point should be as near as possible to the mid-point between the axles of the track sprockets. The fluid motor is connected to a housing of the track assembly by means of a pin and lug arrangement, or other suitable system. The other end of the fluid motor is arranged for detachable connection to the tow lugs on the aircraft axle housing. The single fluid motor system operates in similar manner to the two motor system for snubbing the track to the aircraft wheels.

Figure 12:
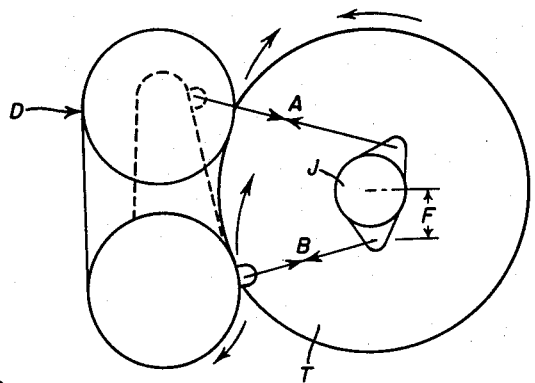
FIG. 12 is a schematic view of a wheel mover illustrating the torque forces involved in moving a wheel.
Figure 13:
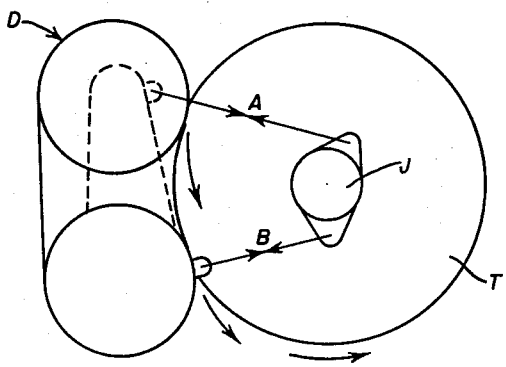
FIG. 13 is another schematic view of a wheel mover illustrating the torque forces involved in braking a moving wheel through an attached driving track.

The snubbing pressure holding the driving tracks against aircraft wheels for large heavy aircraft is a considerable force and the towing lugs must be capable of accomodating such a force. The amount of force required by these cylinders between the aircraft towing lugs and the wheel is directly dependent upon the tractive coefficient between the track and the aircraft tire. In a mover for a B–52, the torque reaction M of the transmission of power between the track and the tire will be transmitted by the hydraulic cylinders A and B shown in FIG. 12. This torque reaction is transmitted through the tire to the aircraft axle J. This reaction forms a torque coupling force about the landing gear axle and it will be of a magnitude of about 2.16 times the applied draw bar pull on the axle due to distance F between the lug fastening center and the center of axle J. The load applied to the lugs by the cylinders is not in addition to the torque load on the wheel, but is actually a working or preload which would have to be overcome by the torque produced by the track prior to any transfer of rotational reaction to the landing gear wheel.

When the towing mechanism is not connected to an aircraft, a landing gear or support wheel for each track is provided, and these consist of a small wheel 50 journalled on a lever arm 51 which permits it to be raised and lowered by a fluid pressure cylinder 52. This landing gear also aids in positioning the wheel mover against the aircraft wheel since the cylinder 52 may be actuated to raise or lower the tracks into proper positioning against the aircraft tire. Two additional landing or support wheels 55 are provided on the front end of the wheel mover to provide a manually lowered wheel for the front end of the wheel mover when the same is disconnected from the tractor.

Figure 5:
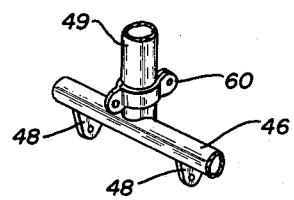
FIG. 5 is a modified clamping arrangement for securing an aircraft mover according to the invention to an aircraft.

In certain instances, a towing lug on the aircraft landing gear may not be sufficiently strong to withstand large forces involved in the snubbing, and an auxiliary clamping device may be used for connecting the snubbing cylinders to the aircraft gear. In the modification illustrated in FIG. 5, a portion of a dual aircraft landing gear is illustrated which includes a horizontal axis housing 46 and an upright strut member 49. Lower lugs 48 are generally satisfactory for holding one of the cylinders on each side. A quick connected clamp 60 may be secured around the upright strut 49 for supporting one or both of the snubbing cylinders, where the upper lugs 48 are not strong enough to withstand the forces. Additional quick connect clamps may be used on the horizontal housing 46 where the lugs are not strong enough to withstand the forces involved.

As pointed out above, each wheel mover assembly includes two endless tracks mounted and driven through a differential. This arrangement is illustrated in detail in FIGS. 8 and 9 where two tracks are driven by a differential gear assembly. The differential gear assembly 22 includes axle housings 65 which extend laterally outwardly beyond the housing enclosing drive axles 66. The axle 66 is interconnected with a drive plate 67 and the plate 67 is interconnected with a sprocket plate 69 by means of bolts 68. The sprocket plate 69 is bolted by means of bolts 70 to a sprocket 71, which include a bifurcated sprocket teeth 72. The sprocket is journalled by suitable bearings 73 around the housing 65 and packing glands 74 provide a complete enclosure for the bearings. The idler sprockets for the track assembly are mounted on an upper axle housing 75 which supports bearing assembly 76 for idler sprocket 77. The sprocket 77 has a brake drum 78 secured thereto by means of bolts 79, so that the brake drum 78 rotates around the end 80 of the housing 75. A brake band holding spider 81 is secured to the housing end 80, and expansion type brake bands, not shown, are operated by means of hydraulic cylinder 44 to push the brake shoe against the drum 78, as is a well known system. In the event the tractor has an air compressor, the fluid pressure cylinder 44 may be an air cylinder for operating the brakes such as a commercial air brake. Where the tractor has a hydraulic pump, the brakes may be operated by hydraulic cylinders. An inner brake drum 85 is secured by bolts 86 to an inner side of the sprocket 77 and provides an additional brake drum which may be interconnected to the operation system of the other side for increased brake drum area and increased braking power. Thus four brake drums are provided for each landing gear.

Each track consists of a series of tread elements 88 pivotally pinned together by means of roller pins 89 to form an endless or crawler-type track arranged to travel around the drive sprocket 71 and the idler bogey or sprocket 77. The roller pins engage the notches of the sprockets. Suitable permanent oil bearings may be used for the roll pins, or grease fittings may be provided. This arrangement provides a smooth relatively easy track rotation. The tread of each track element is scarified for traction when snubbed against the aircraft tire, and the track elements are laterally arcuate to conform to the arcuate tread of the aircraft tire. When snubbed up against the aircraft tire in driving relation, the track should cover a substantial area on the tire, and preferably as much area of the tire as the contact area between the aircraft and ground, with the aircraft at rest and fully loaded. This prevents undue distortion of the aircraft tires when the tracks are snubbed up for aircraft movement.

The track is snubbed up to an aircraft landing gear by means of cylinders, explained above, the lower cylinder of which is attached to lug 96 mounted on the differential housing and upper lug 97 mounted on the idler axle housing 75. A lifting lug 98 is provided centrally of the upper housing 75 for attachment of an overhead hoist or the like.

When the track is not in connection with an aircraft tire, the landing wheels 50 for the aircraft mover are moved to down position by means of fluid pressure cylinder 52. The piston rod 90 of the cylinder 52 is interconnected with a lever arm 91 secured to the housing end 80. The lower end of the cylinder is connected with axle 92 of the wheel 50. The wheel 50 is mounted on a crank arm 93 which is secured to the housing cover 94 enclosing the axle drive plate 67. The crank arm 93 is pivotally attached to permit the wheel 95 to be raised and lowered about the axis housing 65.

Figure 10:
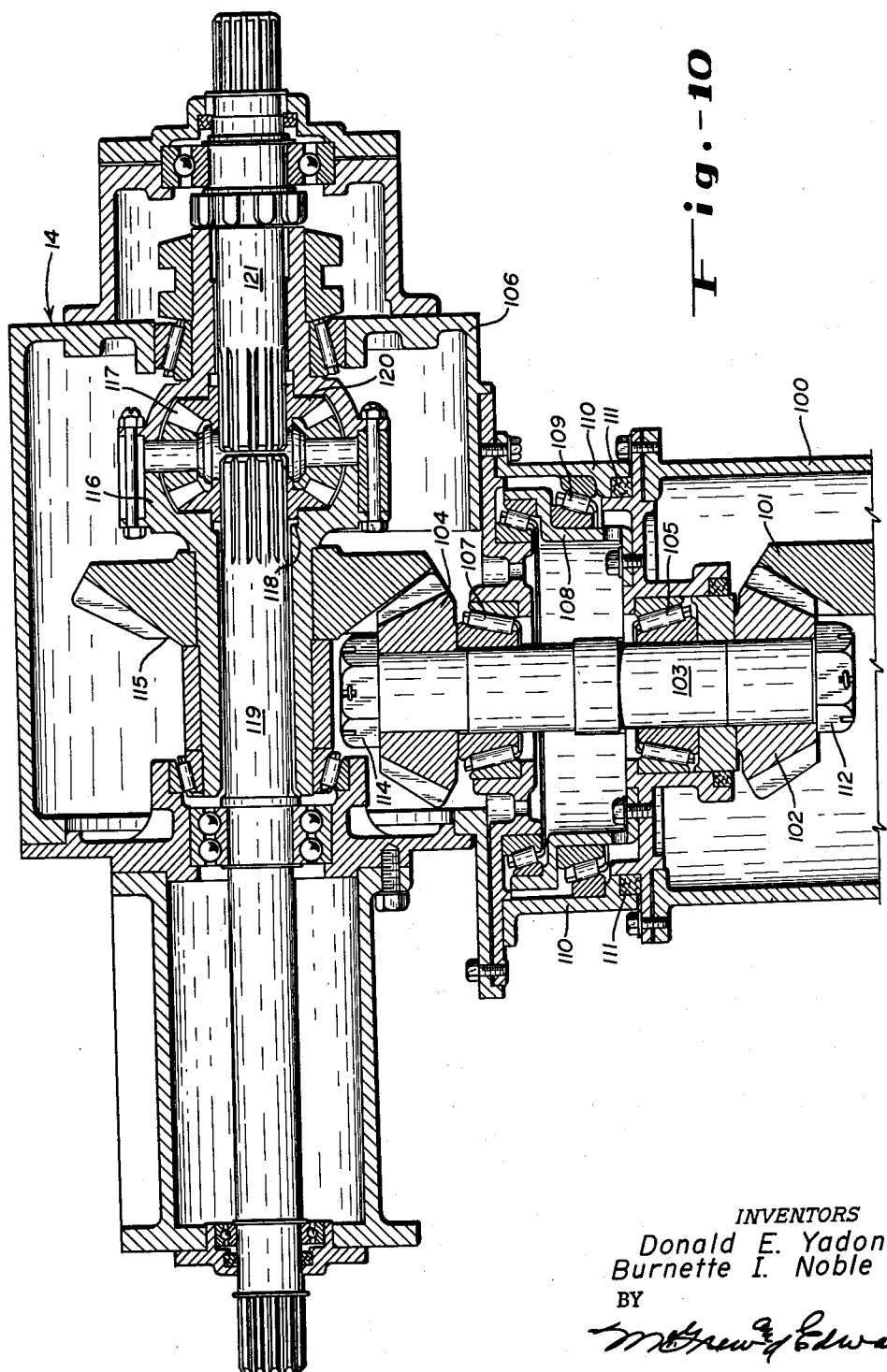
FIG. 10 is a cross sectional, top plan view of a center swivel power transfer assembly.

The tractor is interconnected with the aircraft mover through a three-plane swivel gear housing 14 which permits relative movement of the tractor in a vertical plane, as when the tractor moves up and down inclined surfaces, permits trunnion action of the two-spaced apart wheel mover assemblies as when one wheel assembly moves to a different elevation than the other. This assembly is illustrated in detail in FIG. 10, where gear housing 100 is arranged to be connected more or less rigidly with the draw bar of the tractor. A bevelled gear 101, driven by a right angle bevelled gear connected to its opposite side, not shown, drives a bevelled gear 102. Bevelled gear 102 is mounted on a shaft 103 to which is interconnected another bevelled gear 104. The shaft 103 is journalled in the housing 100 by bearing assembly 105 at the end adjacent gear 102 and journalled in gear housing 106 by means of bearing assembly 107. An internal housing 108 rigidly secured to the housing 100 provides means for supporting a bearing set 109 providing a journal for a rotary housing 110. The housing 110 is secured to the housing 106 and is essentially rigid therewith. A packing gland 111 provides means for sealing the housing against dirt and the like. The gear 102 is held on the shaft 103 by means of a lock-nut 112 and lock-nut 114 holds the gear 104 on its opposite ends. Since the gears bear against the bearing assemblies in the various housings, the shaft 103 with its attached gears holds the two housings 110 and 106 together, while permitting rotation thereof about the axis 103. This action provides a trunnion action for the two wheel mover sets.

Bevelled gear 104 is operatively interconnected with a bevelled gear 115 which is mounted in driving relation on a differential drive 116. A differential drive 117, which is a commonly known system of four bevelled gears, is driven by the drive member 116. The differential set 117 includes a side bevelled gear 118 which is splined to lateral shaft 119. Opposite the gear 118 is another gear 120 which is splined to a short shaft 121. The drive 117 drives the propeller shafts 121 and 119 which are interconnected with the drive shafts 16 and 17, respectively.

The yoke 12 is pinned to the draw bar, and the universal joint connecting the propeller shaft in the draw bar and in the yoke permit the wheel mover to pivot about pin 13 as the elevation of the tractor changes in respect to the pantograph assembly.

The swivel gear boxes 18 and 19 are similar, the difference being in placement as right or left hand units. FIG. 11 shows the details of the major components of the swivel boxes, and description thereof applies to both boxes. A bevelled gear (not shown) mounted on the end of one of the propeller shafts 16 or 17 meshes with bevelled gear 130 secured by a lock nut 131 on short shaft 132. A similar gear 133 is secured to the opposite end by a lock nut 134. The shaft is journalled in bearing set 135 secured in upper housing 136 at the upper end and in bearing set 137 secured in lower housing 138. Inner housing 139 is bolted by bolts 140 to the upper housing which is journalled in bearing sets 141 and 142 internally of outer housing 143. Thus the inner housing is rotatable in the outer housing, providing a swivel action between torque tube 16a which is connected to a bonnet 148 covering the gear 130 and meshed gear (not shown) mounted on drive extension 16b and secured to flange 145. Torque tube 20a which is connected to the bonnet 149 covering gear 133 and secured to flange 146. A gear 170 mounted on drive shaft 20 meshes with intermediate gear 171 which drives a gear (not shown) that meshes with gear 133. The gears 130 and 133 hold the housing together, and gasketing 147 prevents entrance of dirt, water and the like. Plugs 172 in both bonnets provide lubrication inlets or drains as the case may be.

Figure 15:
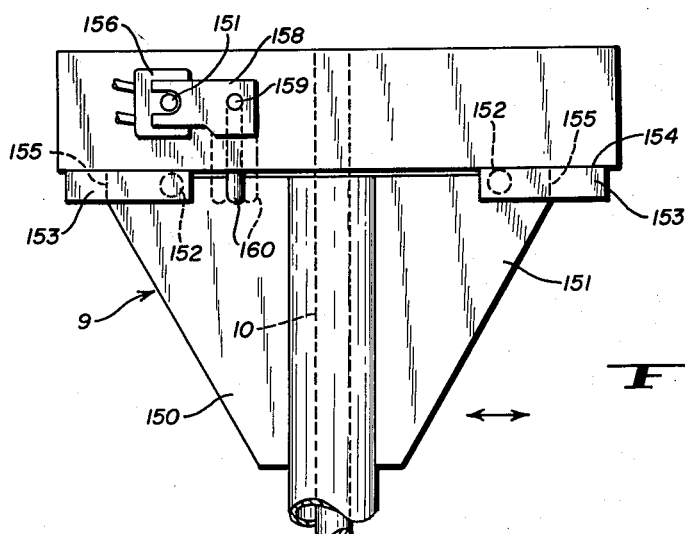
FIG. 15 is a partially schematic view of a steering control mechanism for the pantograph assembly.

The steering of the wheel mover, as pointed out above, is automatically accomplished by lateral movement of the tractor in respect to the pantograph. The control mechanism is schematically shown in FIG. 15 which includes a mounting for the draw bar 9. The draw bar connecting end includes a pair of side projections 150 and 151 on which are mounted a series of rollers 152. Tthe rollers are reciprocably held in retainers 153 which are secured to the end plate 154 of the tractor. Stops 155 prevent over travel of the draw bar laterally. It is thus apparent that the draw bar 9 is permitted to move laterally, the roller providing free movement, and the stops limit the movement thereof. In practice it has been found that one inch travel in both directions from dead center is sufficient to operate a hydraulic valve. The propeller shaft 10 is also arranged to move with the draw bar.

A valve system, not shown, is arranged with cylinders 30 and 31 in such a manner that one cylinder shortens when the other elongates, thus distorting the right parallelogram configuration of the pantograph and turning the aircraft wheels. When the cylinders 30 and 31 are single acting, a pair of valves are so arranged that fluid under pressure is introduced into one cylinder while the fluid in the other cylinder is released. When the cylinders are double acting, the valves are arranged so that fluid under pressure is introduced for extension of one cylinder and retraction of the other, while the opposite side of each cylinder releases fluid. Thus a similar valve arrangement may be used for both types of cylinders. The valves may be any convenient valve, and a spool valve is satisfactory.

The valve set 156 is operated by an upright lever 151 which, with a spool valve, pivots forwardly and backwardly during operation. A yoke 158 is pivotally secured to a shaft 159 so that pivotal movement of the yoke around shaft 159 pivots lever 151 forwardly and backwardly which opens and closes the valve 156. A pin 160 extends through the tractor end wall 154 and engages the draw bar 9, so that the pin 160 pivots around pivot 159. The pivotal movement of pin 160 also pivots yoke 158 which in turn moves lever arm 151 forward and backward.

For operation of the pantograph steering mechanism, the tractor must move laterally in relation to the pantograph. This is accomplished by turning the tractor. As the tractor moves laterally, the pin 160 is moved operating the valve 156 to elongate one of the steering cylinders and to shorten the other. This centers the draw bar closing the valve and maintaining the pantograph in that configuration until another lateral movement operates the valve. Thus the pantograph seals the centered position on the hitch, which is the position of least strain between the tractor and the pantograph.

The pin 160 and yoke 158 are interconnected with the lever which controls the power distribution to either the tractor wheels or the draw bar. When the power is applied to the tractor wheels, the pin 160 is withdrawn from engagement with draw bar so that the pantograph mechanism is inoperative. Also, a lock pin (not shown) may be used to prevent relative movement of the draw bar and tractor so as to prevent operation of the valve 156 during certain operations even when the tractor power is applied to propeller shaft 10 and the pin 160 is in engagement with the draw bar.

Figure 14:
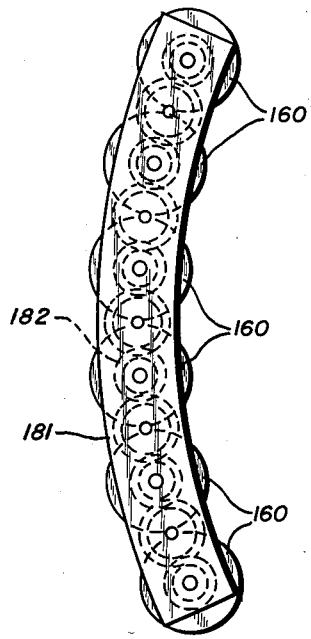
FIG. 14 is a schematic view of a modified aircraft wheel drive mechanism.

In place of the track arrangement for snubbing against an aircraft wheel, other drive members may be used. A modified driver, for example, is illustrated in FIG. 14 wherein a series of rollers 160 are mounted in an arcuate frame 181. The rollers preferably are concave to conform to the lateral curve of the tire tread, and the frame 181 supports the rollers in an arc which conforms to the peripheral curvature of the tire. The rollers are individually driven in the same direction by a gear train 182. Such a gear train arrangement includes a gear driving each roller and an idler gear between each roller gear to interconnect these gears and provide rotation in the same direction. The drive for the roller assembly is through a differential, as with the tracks, to provide for different turn radius of the aircraft wheels. The roller assembly is snubbed to a tire in a manner similar to that described for the tracks above, and operation is, also, similar.

While the invention has been described by reference to a particular device, there is no intent to limit the spirit and scope to the precise details so set forth, except insofar as defined in the following claims.

We claim:

1. The combination with an aircraft landing wheel providing nonflying support for an aircraft of a mover assembly for applying ground movement to said aircraft through said wheel, comprising a self-propelled vehicle adapted to be driven in opposite directions and having an extension assembly at one of its ends, said assembly including a wheel supported power unit adapted to be positioned in ground contact during separated movement toward and away from an aircraft and movable to an elevated position above ground contact when the assembly is in driving connection with an aircraft, an endless track supported by said power unit in position for movement into pressure-engaging relation with the wheel tread of the aircraft, means associated with said track for holding said track in pressure engagement with said wheel during ground movement of said aircraft, and control means operable from said vehicle for driving the aircraft wheel through said track in forward and rearward rotation.

2. The combination according to claim 1 in which the control means includes aircraft steering means mounted on said extension assembly for moving the aircraft in forward and rearward lineal movement.

3. The combination of claim 1 in which the control means includes aircraft steering means mounted on said extension assembly for moving the aircraft in forward and rearward linear movements, and two sets of steerable wheels on said mover assembly for turning movements up to essentially the minimum turning radius of the aircraft.

4. The combination with an aircraft landing wheel providing nonflying support for the aircraft, of a tractor assembly for applying ground movement to the aircraft through the landing wheel, comprising a self-propelled vehicle adapted to be driven in opposite directions having a power take-off extension assembly at one of its ends, said assembly including a wheel supported power unit adapted to be positioned in ground contact during separated movement toward and away from an aircraft and movable to an elevated position above ground contact when the assembly is in driving connection with an aircraft, an endless track supported by said power unit in position for movement into pressure-engaging relation with the wheel tread of the aircraft, means associated with said track for holding said track in engagement with the aircraft wheel during ground movements, means for arresting track movement at any point in its rotation while in pressure contact with the wheel to thereby apply a braking action to the aircraft wheel, and control means operable from the vehicle for driving the wheel through said track in forward and rearward rotation.

5. A propulsion assembly for ground movement of aircraft having at least a pair of spaced-apart landing wheels, comprising a frame member, a pair of horizontally spaced-apart flexible endless tracks each adapted to be positioned in pressure engagement with a portion of the tread of one of the aircraft wheels when in ground supported position, each said endless track having forward and return stretches passing over spaced-apart pulleys journalled for rotation on said frame member, one pulley of each track being the drive pulley thereof and the other being an idler pulley, the two drive pulleys of said assembly being interconnected through a differential gear assembly connecting the shafts thereof, means in said assembly for driving said tracks through said differential to thereby impart forward and reverse rotation to said wheels, and means interconnected with said assembly for holding said tracks under pressure in conforming engagement with the tread surfaces of their respective wheels for ground operation.

6. A propulsion assembly for ground movement of aircraft comprising a frame member, a pair of spaced-apart flexible endless tracks each having forward and return stretches passing over spaced-apart pulleys mounted on said frame member, one pulley of each track being a drive pulley and the other being an idler pulley, a common axle and housing interconnecting said idler pulleys and secured on said frame member, a common axle inclusive of a differential gear assembly and housing interconnecting said drive pulleys and secured to said frame member, means inclusive of two fluid pressure cylinders each of which is arranged to be interconnected at one end to the housing between said tracks and arranged for connection at the opposite end with the aircraft landing gear for maintaining contacting stretches of tracks in conforming engagement under pressure with its associated aircraft wheel.

7. A prime mover for imparting ground movement to aircraft comprising a pantograph frame assembly inclusive of a pair of flexible, endless tracks providing power transmission units adapted to be held in driving engagement with the wheels of an aircraft landing gear assembly, a forward member having a gear system for power transmission in opposite directions laterally of the gear system, power transmission members extending from opposite ends of said forward member and a swivel mounting at each said opposite ends, a torque tube supported by and extending rearwardly from each said swivel mounting for connection with an aircraft wheel power transmission assembly whereby power may be supplied from the prime mover to the aircraft wheel, power transmission means interconnected with said forward member for driving said power system, and means associated with the forward member for applying a turning force to the pantograph assembly during turning movements of the aircraft wheels.

8. A prime mover according to claim 7 in which the means for applying a turning force includes a fluid pressure cylinder extending from a central portion of the forward member to adjacent each wheel power transmission assembly.

9. A prime mover for ground movement of aircraft comprising a pantograph assembly of drive shafts to divide power from a single rotary drive shaft to multiple power units for driving aircraft wheels, comprising a forward member having a gear system interconnected with a single rotary drive shaft and having opposed drive shafts laterally of a gear system interconnected with said single rotary drive member, power transmission members extending from the opposite ends of said forward member and a swivel mounting at each end thereof, a swivel mounting at the gear system on said forward member to provide a variable angular direction of said drive shaft with said forward member, a torque tube extending rearwardly of and supported from each said swivel connection, power transmission means inclusive of a differential gear box interconnected with the end of each said torque tube arranged for interconnection for the aircraft wheel for supplying rotary movement thereto, and means inclusive of fluid pressure cylinders interconnected between said first swivel member and each said aircraft driving member for applying a turning force to said pantograph assembly during turning movements of said aircraft.

10. A propulsion assembly for ground movement of wheeled aircraft comprising frame means supporting an endless track having forward and reverse stretches passing over spaced apart pulleys, adjustable means mounted on said frame means arranged for temporary connection to an aircraft landing wheel assembly for positioning said track above the ground in engagement with a portion of the tread of an aircraft wheel, means for activating said adjustable means so as to hold said track in driving contact with the aircraft wheel under substantially uniform pressure and in conforming engagement therewith, and means in said assembly for driving the track to impart forward and reverse rotation to the wheel.

11. A propulsion assembly according to claim 10 in which said track comprises a series of tread members in hinged connection and each having a friction surface for engagement with the aircraft wheel.

12. A propulsion assembly for ground movement of wheeled aircraft comprising frame means supporting an endless track having forward and reverse stretches passing over spaced apart pulleys, adjustable means mounted on said frame means arranged for temporary connection to an aircraft landing wheel assembly for positioning said track above the ground in engagement with a portion of the tread of an aircraft wheel, means for activating said adjustable means so as to hold said track in driving contact with the aircraft wheel under substantially uniform pressure and in conforming engagement therewith, brake means mounted on said frame means for arresting movement of the track and thereby holding it and the aircraft wheel against movement when in engagement with the aircraft wheel, and means in said assembly for driving the track to impart forward and reverse rotation to the wheel.

13. A propulsion assembly for ground movement of wheeled aircraft comprising frame means supporting an endless track having forward and reverse stretches passing over spaced apart pulleys, each said pulley being mounted on a shaft journalled in said frame means supporting said pulleys in spaced apart relation, adjustable means mounted on said frame means arranged for temporary connection to an aircraft landing wheel assembly for positioning said track above the ground in engagement with a portion of the tread of an aircraft wheel, means for activating said adjustable means so as to hold said track in driving contact with the aircraft wheel under substantially uniform pressure and in conforming engagement therewith, and means in said assembly for driving the track to impart forward and reverse rotation to the wheel.

References Cited in the file of this patent

UNITED STATES PATENTS

| | | |
|---|---|---|
| 1,394,328 | Miller | Oct. 18, 1921 |
| 1,942,637 | Best | Jan. 9, 1934 |
| 2,328,233 | Schunk | Aug. 31, 1943 |
| 2,409,552 | Donnellan | Oct. 15, 1946 |
| 2,515,991 | Dufour | July 18, 1950 |
| 2,581,123 | Merkle | Jan. 1, 1952 |
| 2,714,011 | Albee | July 26, 1955 |
| 2,731,855 | Schmal | Jan. 24, 1956 |
| 2,751,990 | Finlay et al. | June 26, 1956 |
| 2,966,222 | Lambert | Dec. 27, 1960 |

FOREIGN PATENTS

| | | |
|---|---|---|
| 248,148 | Switzerland | Jan. 16, 1948 |